US012127714B2

(12) United States Patent
Candler

(10) Patent No.: US 12,127,714 B2
(45) Date of Patent: Oct. 29, 2024

(54) FOOD PROCESSING DEVICE

(71) Applicant: Robert F. Candler, Shelton, CT (US)

(72) Inventor: Robert F. Candler, Shelton, CT (US)

(73) Assignee: Conair LLC, Stamford, CT (US)

( * ) Notice: Subject to any disclaimer, the term of this patent is extended or adjusted under 35 U.S.C. 154(b) by 121 days.

(21) Appl. No.: 15/088,471

(22) Filed: Apr. 1, 2016

(65) Prior Publication Data
US 2017/0280938 A1 Oct. 5, 2017

(51) Int. Cl.
*A47J 43/044* (2006.01)
*A47J 43/07* (2006.01)

(52) U.S. Cl.
CPC ......... *A47J 43/044* (2013.01); *A47J 43/0711* (2013.01)

(58) Field of Classification Search
CPC ...... A47J 43/07; A47J 43/044; A47J 43/0711; A47J 43/075; B26D 1/29; B26D 3/22; B26D 3/225; B26D 2003/285–288
See application file for complete search history.

(56) References Cited

U.S. PATENT DOCUMENTS

| | | | |
|---|---|---|---|
| 100,280 A | 3/1870 | Gerhard | |
| 1,212,915 A * | 1/1917 | Daughtry | F25C 5/043 30/136.5 |
| 2,715,927 A * | 8/1955 | Cupper | B26D 3/22 269/54.4 |
| 3,032,086 A * | 5/1962 | Daugherty | B26D 7/22 83/115 |
| 4,190,208 A * | 2/1980 | Schaeffer | A47J 43/06 241/282.2 |
| 4,194,697 A * | 3/1980 | Lembeck | A47J 43/06 222/352 |
| 4,198,887 A * | 4/1980 | Williams, Jr. | B26D 1/29 241/92 |
| 4,256,265 A * | 3/1981 | Madan | B26D 3/22 241/92 |
| 4,364,525 A * | 12/1982 | McClean | B26D 3/225 241/239 |
| 4,393,737 A * | 7/1983 | Shibata | B26D 3/22 241/282.2 |
| 4,602,543 A * | 7/1986 | Homma | B26D 1/29 241/92 |
| 5,064,535 A * | 11/1991 | Hsu | A47J 43/24 210/380.1 |
| 5,156,084 A * | 10/1992 | Lin | A47J 43/06 210/380.1 |
| 5,216,031 A * | 6/1993 | Dobson | B26D 3/22 83/865 |

(Continued)

*Primary Examiner* — Adam J Eiseman
*Assistant Examiner* — Richard D Crosby, Jr.
(74) *Attorney, Agent, or Firm* — Grogan, Tuccillo & Vanderleeden, LLP

(57) ABSTRACT

A food processing device includes a lower container, a processing plate received atop the lower container, the processing container having a floor, a peripheral sidewall, and at least first and second apertures formed in the floor, the lower container and the processing plate defining a collection volume therebetween, a lid received atop the processing plate and defining a processing volume interior to the lid and the processing plate, a first cutting member positioned in the first opening of the processing plate, and a second cutting member positioned in the second opening of the processing plate.

8 Claims, 10 Drawing Sheets

(56) References Cited

U.S. PATENT DOCUMENTS

| | | | | |
|---|---|---|---|---|
| 5,562,025 A * | 10/1996 | Bull | | A47J 43/24 |
| | | | | 210/360.1 |
| 5,664,332 A * | 9/1997 | Whited | | B26B 25/002 |
| | | | | 30/276 |
| 5,735,193 A * | 4/1998 | Chang | | A47J 43/044 |
| | | | | 241/282.1 |
| RE36,155 E | 3/1999 | Scallen | | |
| 5,896,801 A * | 4/1999 | Jacko | | B26D 3/22 |
| | | | | 83/356.3 |
| 5,983,769 A * | 11/1999 | Schneider | | A47J 43/255 |
| | | | | 241/101.4 |
| 5,992,287 A * | 11/1999 | Dube | | B26D 3/11 |
| | | | | 241/282.2 |
| 6,302,014 B1 * | 10/2001 | Kuan | | A47J 43/1018 |
| | | | | 241/169.1 |
| 6,505,545 B2 * | 1/2003 | Kennedy | | A47J 27/04 |
| | | | | 366/145 |
| D486,703 S * | 2/2004 | Settele | | D7/695 |
| 6,971,597 B2 * | 12/2005 | Starr | | A47J 43/0716 |
| | | | | 241/278.1 |
| 7,066,071 B2 * | 6/2006 | Zeder | | B26D 3/283 |
| | | | | 30/278 |
| 7,143,677 B2 | 12/2006 | Zeder et al. | | |
| 7,669,793 B2 * | 3/2010 | So | | A47J 43/044 |
| | | | | 241/169.1 |
| 7,975,605 B2 * | 7/2011 | Wan | | F26B 5/08 |
| | | | | 34/58 |
| 8,181,560 B2 * | 5/2012 | Hauser | | B26D 3/283 |
| | | | | 83/858 |
| 8,272,588 B2 * | 9/2012 | Burke | | B26D 1/29 |
| | | | | 241/298 |
| D679,964 S * | 4/2013 | Deconzo | | D7/695 |
| 8,596,173 B2 * | 12/2013 | Fung | | A47J 17/04 |
| | | | | 83/13 |
| 8,596,192 B2 | 12/2013 | Hauser et al. | | |
| 8,602,335 B2 * | 12/2013 | Krasznai | | A47J 43/0711 |
| | | | | 241/278.1 |
| 8,695,490 B2 * | 4/2014 | Harris | | A47J 43/1031 |
| | | | | 99/537 |
| 8,708,262 B2 * | 4/2014 | Wong | | A47J 43/1025 |
| | | | | 241/169.1 |
| 8,813,640 B2 * | 8/2014 | Wong | | B26D 3/283 |
| | | | | 83/856 |
| 8,944,357 B2 * | 2/2015 | Conti | | A47J 43/0722 |
| | | | | 241/282.2 |
| 9,204,758 B2 * | 12/2015 | Wong | | A47J 43/082 |
| 9,265,381 B2 * | 2/2016 | Beber | | A47J 43/0722 |
| 9,439,539 B2 * | 9/2016 | Gushwa | | B26D 1/29 |
| D796,274 S * | 9/2017 | Do | | D7/693 |
| 9,770,134 B2 * | 9/2017 | Unteregger | | A47J 43/07 |
| 10,080,463 B2 * | 9/2018 | Harris | | A47J 43/044 |
| 2004/0159727 A1 * | 8/2004 | Mueller | | A47J 43/1025 |
| | | | | 241/169.1 |
| 2004/0231482 A1 * | 11/2004 | Boilen | | B26D 3/283 |
| | | | | 83/425.3 |
| 2007/0125207 A1 * | 6/2007 | Lucas | | B26D 3/283 |
| | | | | 83/13 |
| 2007/0137457 A1 * | 6/2007 | Botsai | | B26D 7/00 |
| | | | | 83/858 |
| 2008/0164357 A1 * | 7/2008 | Chau | | A47J 43/105 |
| | | | | 241/285.2 |
| 2008/0271614 A1 | 11/2008 | Chan | | |
| 2010/0154658 A1 * | 6/2010 | Conti | | A47J 43/0711 |
| | | | | 99/537 |
| 2011/0192290 A1 * | 8/2011 | Hauser | | B26D 3/283 |
| | | | | 99/537 |
| 2015/0079258 A1 * | 3/2015 | Szymanski | | B26B 11/00 |
| | | | | 83/13 |
| 2017/0112327 A1 * | 4/2017 | Harris | | A47J 43/044 |
| 2017/0280938 A1 * | 10/2017 | Candler | | A47J 43/0711 |

* cited by examiner

FOOD PROCESSING DEVICE

FIELD OF THE INVENTION

The present invention relates generally to food processing devices and, more particularly, to a food processing device for slicing food items into spiral strips.

BACKGROUND OF THE INVENTION

Food processing devices providing a number of different types of food preparations, such as mixing, grinding, chopping, slicing, grating, shredding, or other processing operations, are well known. These devices may be manually operated, requiring manual effort by a user to rotate either a slicing blade relative to a food item, or food item relative to a slicing blade, or automatically driven, such as by an electric motor.

While existing food processing devices are generally suitable for what is regarded as ordinary performance, there is room for improvement in terms of ease and convenience of use, expanded functionality, modularity and overall safety. In particular, many existing food processing devices are large and cumbersome, requiring a fair amount of counter space to operate and a fair amount of intuition on the part of a user to configure the device to perform a desired processing operation. Moreover, while typical electrically-driven appliances often have a number of integrated safety features, similar features are often absent or less robust on many manually-operated devices.

SUMMARY OF THE INVENTION

It is an object of the present invention to provide a food processing device.

It is another object of the present invention to provide a food processing device configured to slice food items into spiral strips.

It is another object of the present invention to provide a food processing device that is modular.

It is another object of the present invention to provide a food processing device that is convenient and easy to operate.

It is another object of the present invention to provide a food processing device having a safety feature that prevents inadvertent contact with a slicing blade.

These and other objects are achieved by the present invention.

According to an embodiment of the present invention, a food processing device is provided. The food processing device includes a lower container, a processing plate received atop the lower container, the processing container having a floor, a peripheral sidewall, and at least first and second apertures formed in the floor, the lower container and the processing plate defining a collection volume therebetween, a lid received atop the processing plate and defining a processing volume interior to the lid and the processing plate, a first cutting member positioned in the first opening of the processing plate, and a second cutting member positioned in the second opening of the processing plate.

According to another embodiment of the present invention, a method of operating a food processing device having a collection container, a processing plate received atop the collection container, and a lid received atop the processing plate is provided. The method includes the steps of inserting a first cutting member into a first opening in a floor of said processing plate, inserting a second cutting member into a second opening in said floor of said processing plate, rotating said first cutting member within said first opening to expose a slicing blade to a processing chamber above said processing plate, and rotating said second cutting member within said second opening to expose a first plurality of julienne blades to said processing chamber.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
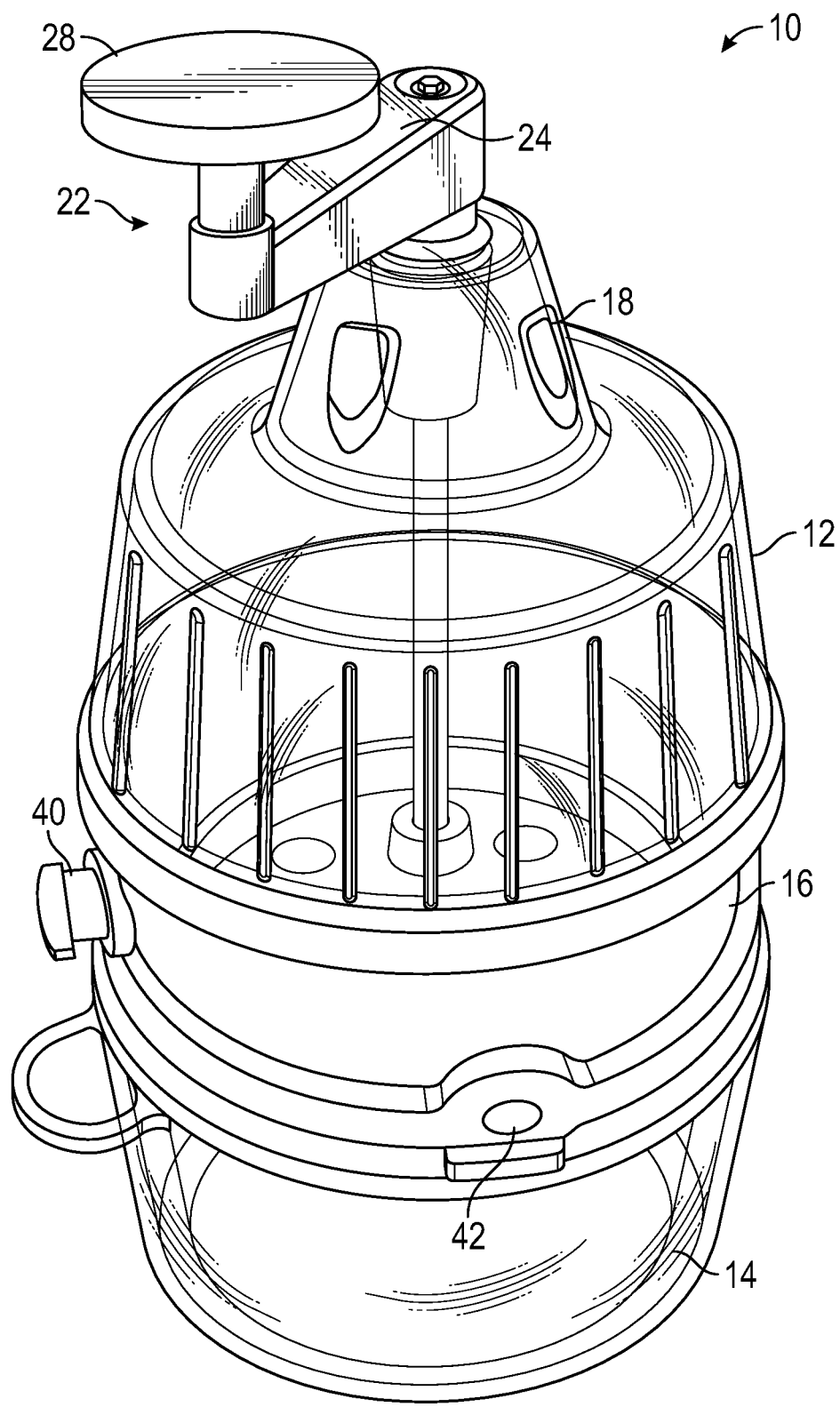
FIG. 1 is a perspective view of a food processing device according to an embodiment of the present invention.
Figure 2:
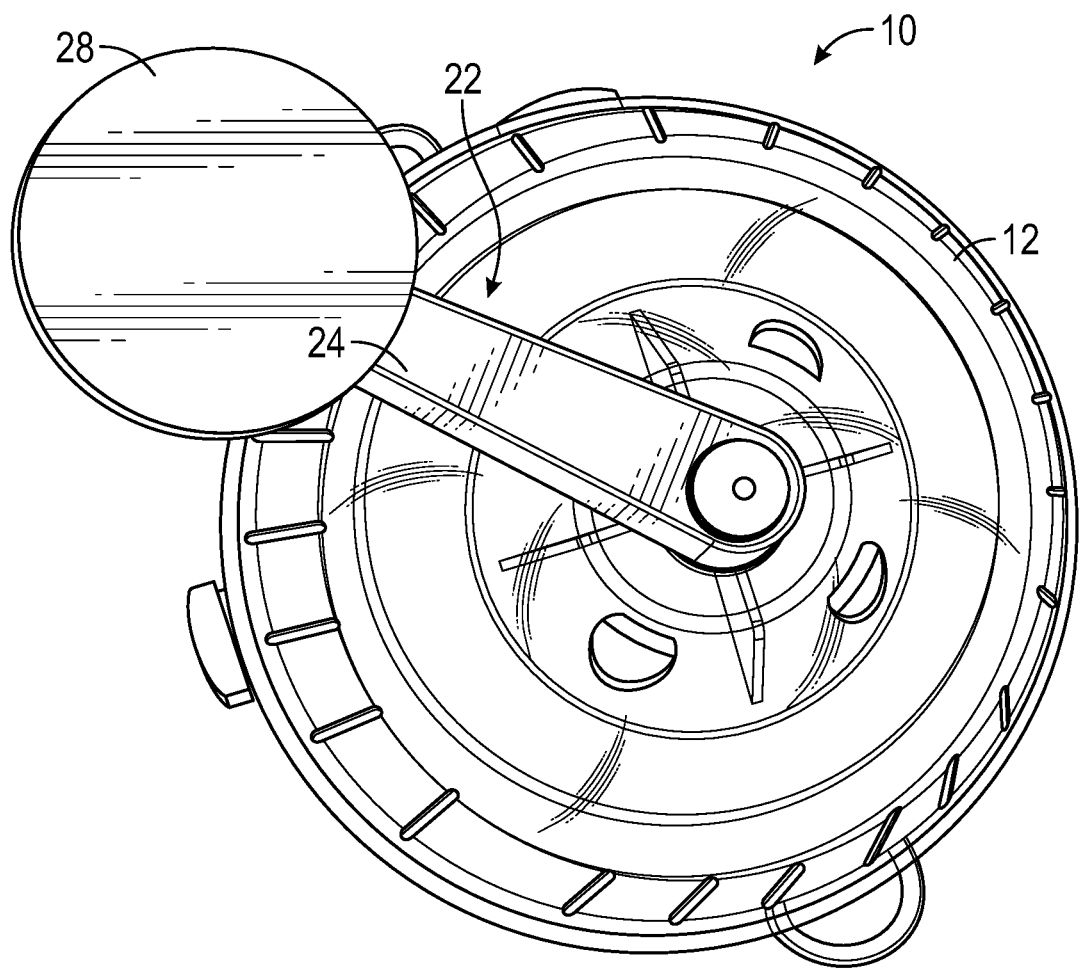
FIG. 2 is a top, plan view of the food processing device of FIG. 1.
Figure 3:
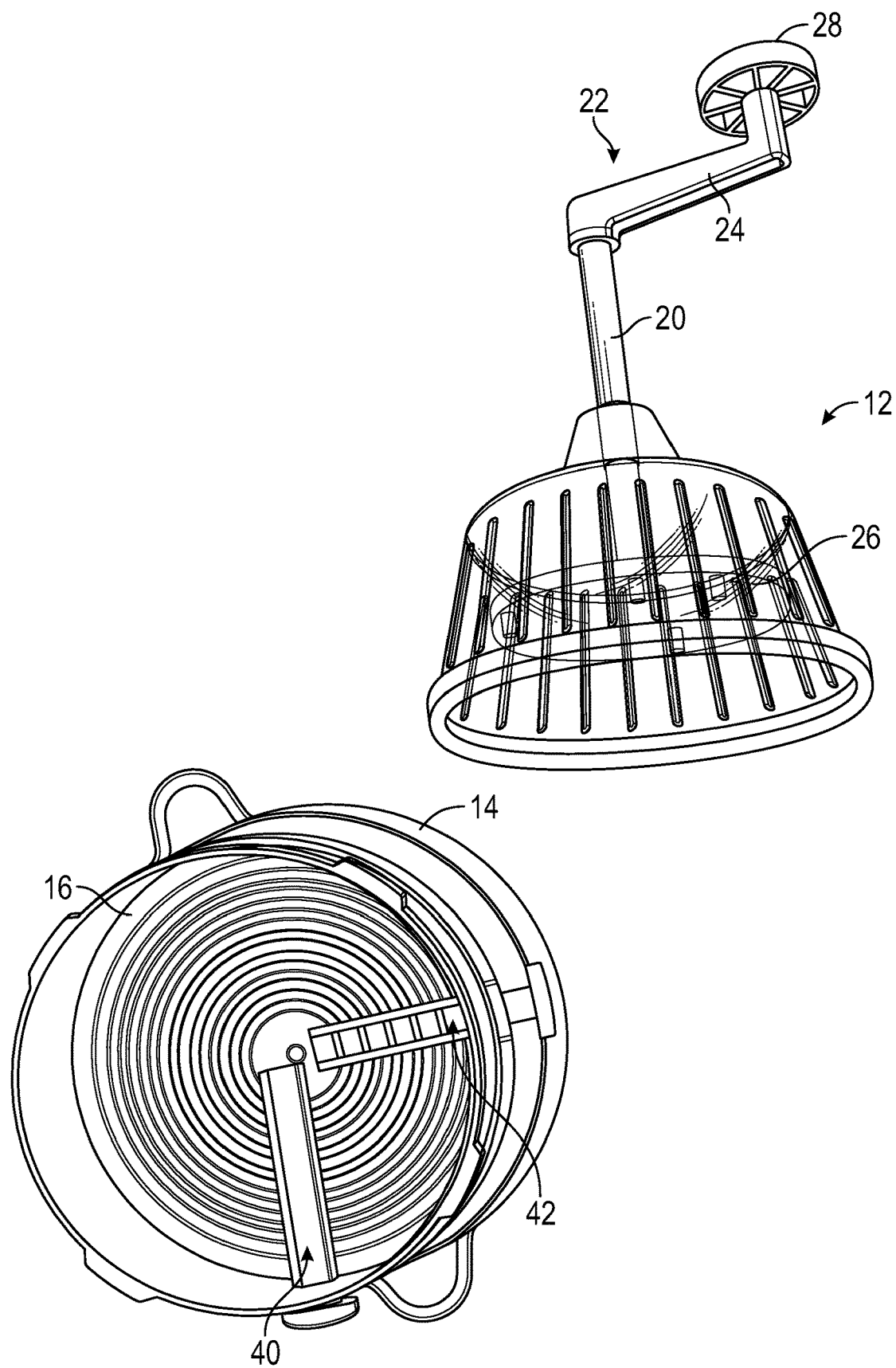
FIG. 3 is a perspective view of a lid and pusher, and a processing plate, of the food processing device of FIG. 1.

Referring to FIGS. 1-3, a food processing device 10 according to the present invention is shown. The food processing device 10 includes a lid 12, a collection container 14 and a processing plate 16 positioned intermediate the lid 12 and the collection container 14. As shown therein, the device (including the lid 12, processing plate 16 and collection container 14) is generally cylindrical in shape, although the device may take other shapes such as square, hexagonal and the like without departing from the broader aspects of the present invention. Preferably, the lid 14 and collection container 14 are transparent so that a user may see the food item to be/being processed.

With particular reference to FIG. 1, at the top of the lid 12, substantially at the center, the lid 12 includes a neck 18 having an opening for receiving the shaft 20 of a driving member 22 therethrough. The driving member, as best shown in FIG. 3, includes the shaft 20, a crank handle 24 connected to the shaft 20 at an upper end thereof, and a pusher plate 26 connected to the shaft 20 at a lower end thereof. The crank handle 24 preferably extends radially outward from the upper end of the shaft 20 and includes a rotatable knob 28 connected to the distal end of the crank handle 24. In use, a user may advance the pusher plate 26 relative to the lid 12 by rotating driving member 22 in one direction and applying downward hand pressure on the crank handle 24. As best shown in FIG. 3, the pusher plate 26 of the driving member has a plurality of protrusions formed on the bottom of the plate 26 to pierce and/or grip a food item to be processed, in order that the food item may be rotated by rotation of the driving member.

With further reference to FIG. 1, the neck 18 is preferably conical in shape which provides a clearance or offset between the general top surface of the lid 12 and the crank handle 24 of the driving member 22. This is opposed to the generally planar top surfaces of many existing devices. Importantly, this offset provided by the conical neck 18 provides for a less impeded rotation of the crank handle 24 and eliminates the possibility of a user's hand striking the lid 12 during use. As further shown in FIG. 1, the lid 12 may also have a plurality of ribs formed on the outer surface thereof that provide a gripping means by which a user can better grasp the device 10 during use.

Turning now to FIGS. 4-10, the processing plate 16 of the food processing device 10 is more clearly illustrated. As shown therein, the processing plate 16 is generally cylindrical in shape defining a container, and has a peripheral sidewall 30, a floor 32 and an open top. A top rim of the processing plate 16 may be formed with a plurality of radial lugs 34 that are configured to receive corresponding slots (not shown) in a lower rim of the lid 12, which enable the lid to be locked to the processing plate 16 in a bayonet-like manner. In this locking position, the lid 12 and processing plate 16 define a processing volume therein within which a food item may be placed for subsequent processing.

As further illustrated in FIGS. 4-10, the floor 32 of the processing plate 16 includes first and second rectangular apertures 36, 38 formed therein, and first and second cutting members 40, 42 received within the apertures 36, 38, respectively. The apertures 36, 38 and cutting member 40, 42 are preferably oriented approximately ninety degrees relative to one another. The cutting members 40, 42 extend through apertures in the sidewall 30 of the processing plate 16 to the center of the floor 32, and are mounted for rotation about a longitudinal axis (of the cutting members) within the apertures 36, 38. Each of the cutting members 40, 42 includes a knob or tab 44, 46 that is accessible from outside of sidewall 30 of the processing plate 16, and which is graspable by a user to selectively rotate the cutting members 40, 42 within the apertures 36, 38, as discussed in detail hereinafter.

Figure 4:
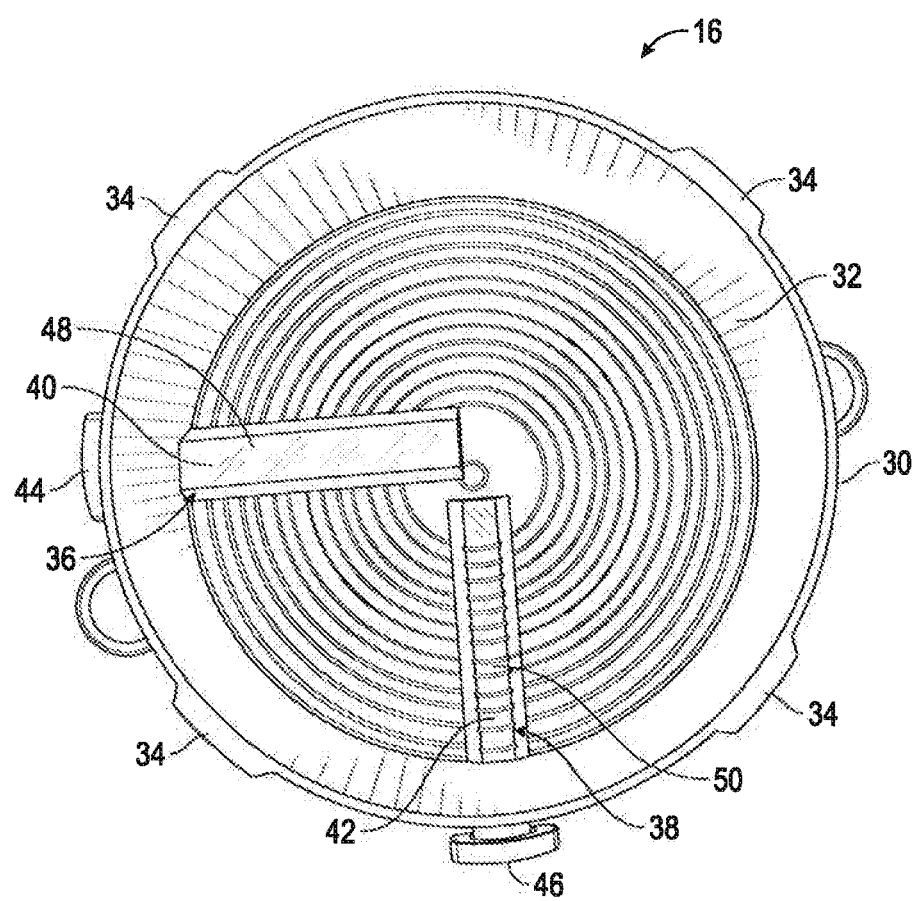
FIG. 4 is a top plan view of the processing plate, showing a julienne blade and slicing blade in a stowed, safety orientation.
Figure 5:
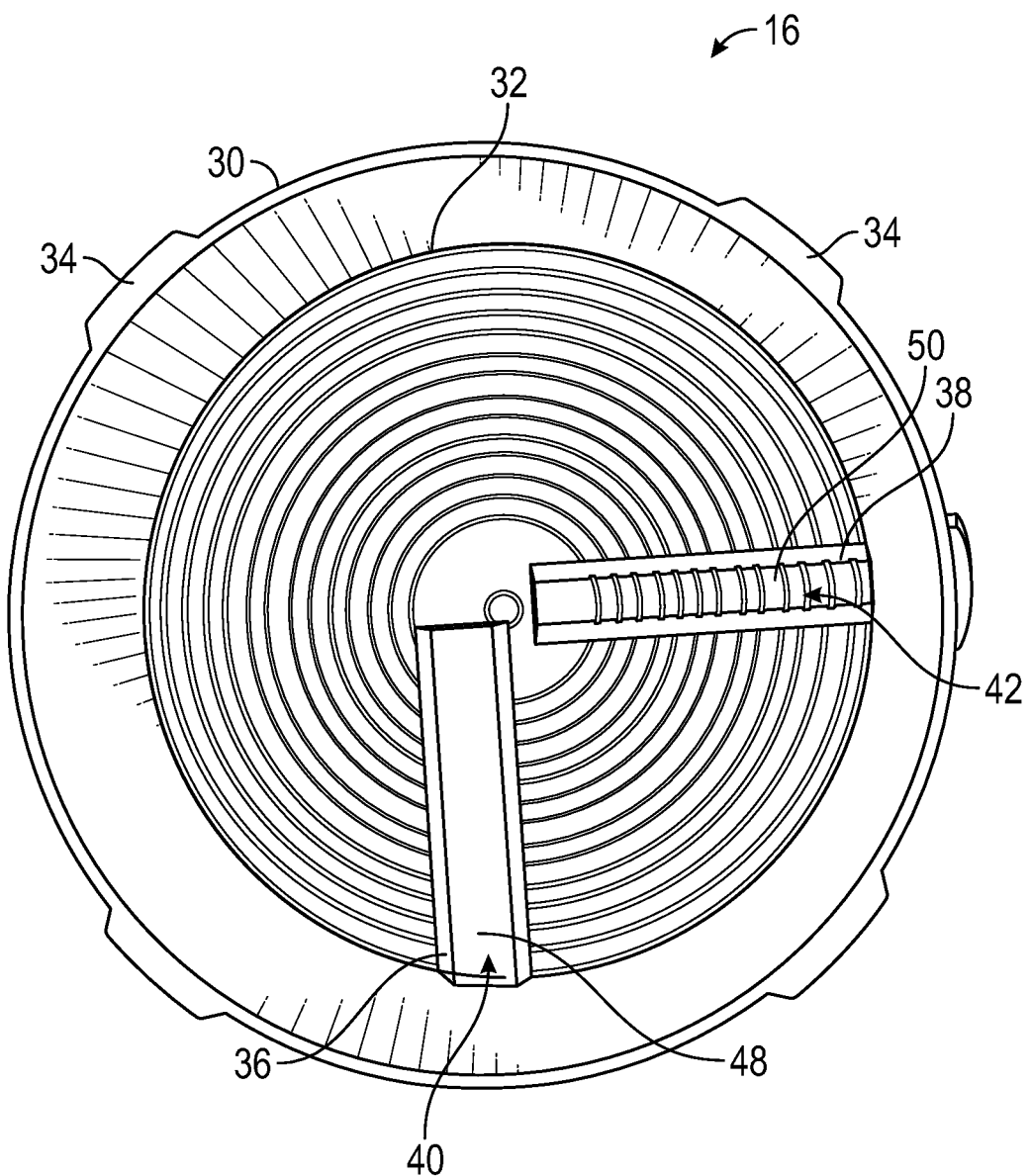
FIG. 5 is another top plan view of the processing plate, showing the julienne blade and slicing blade in the stowed, safety orientation.

In the preferred embodiment, cutting member 40 is configured as a slicing blade for cutting slices from a food item, while cutting member 42 is a julienne blade having a plurality of vertically-oriented blades for cutting thin strips from the food item. Importantly, as best shown in FIGS. 4 and 5, each of the cutting members 40, 42 is a multi-faceted member having a flat, safety side 48, 50. The members 40, 42 are each rotatable within apertures 36, 38, respectively, to selectively position the flat side 48, 50 such that it faces upward. In this position, the flat sides 48, 50 are generally coplanar with the floor 32 of the processing plate 16 and the cutting blades of the respective members are hidden below the floor 32.

Figure 6:
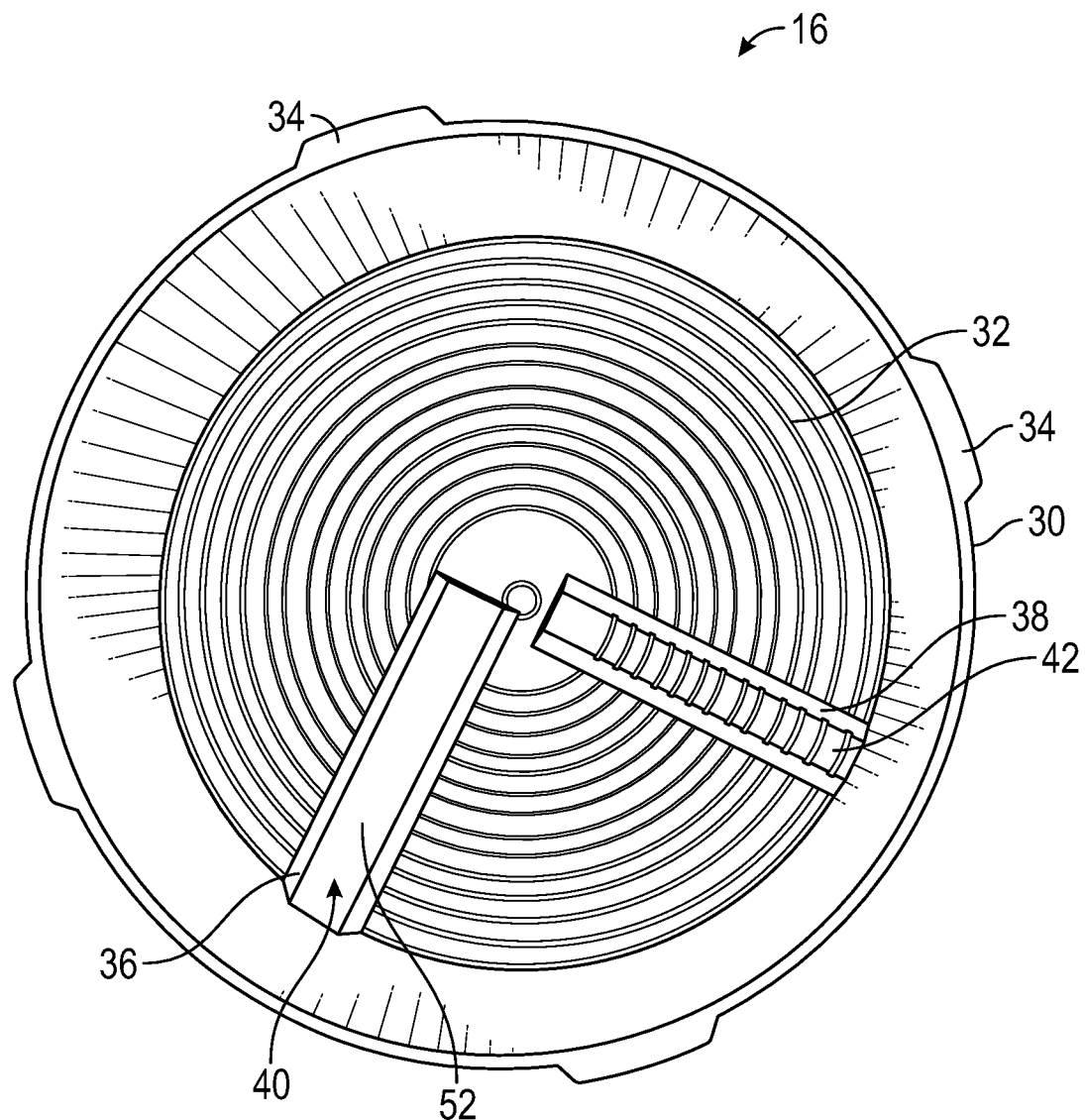
FIG. 6 is a top plan view of the processing plate, showing the julienne blade in the stowed, safety orientation and the slicing blade in a processing orientation.

As best illustrated in FIG. 6, the cutting member 40 includes a slicing blade 52 on a reverse side thereof (e.g., opposite the flat face 48). The cutting member 40 is rotatable, via rotation of knob 44, to expose the blade 52 within the aperture 36. In this position, a leading edge of the blade extends slightly above the floor 32 (and is positioned generally parallel to the floor 32) so that food items may be transformed into slices, as discussed hereinafter.

Figure 7:
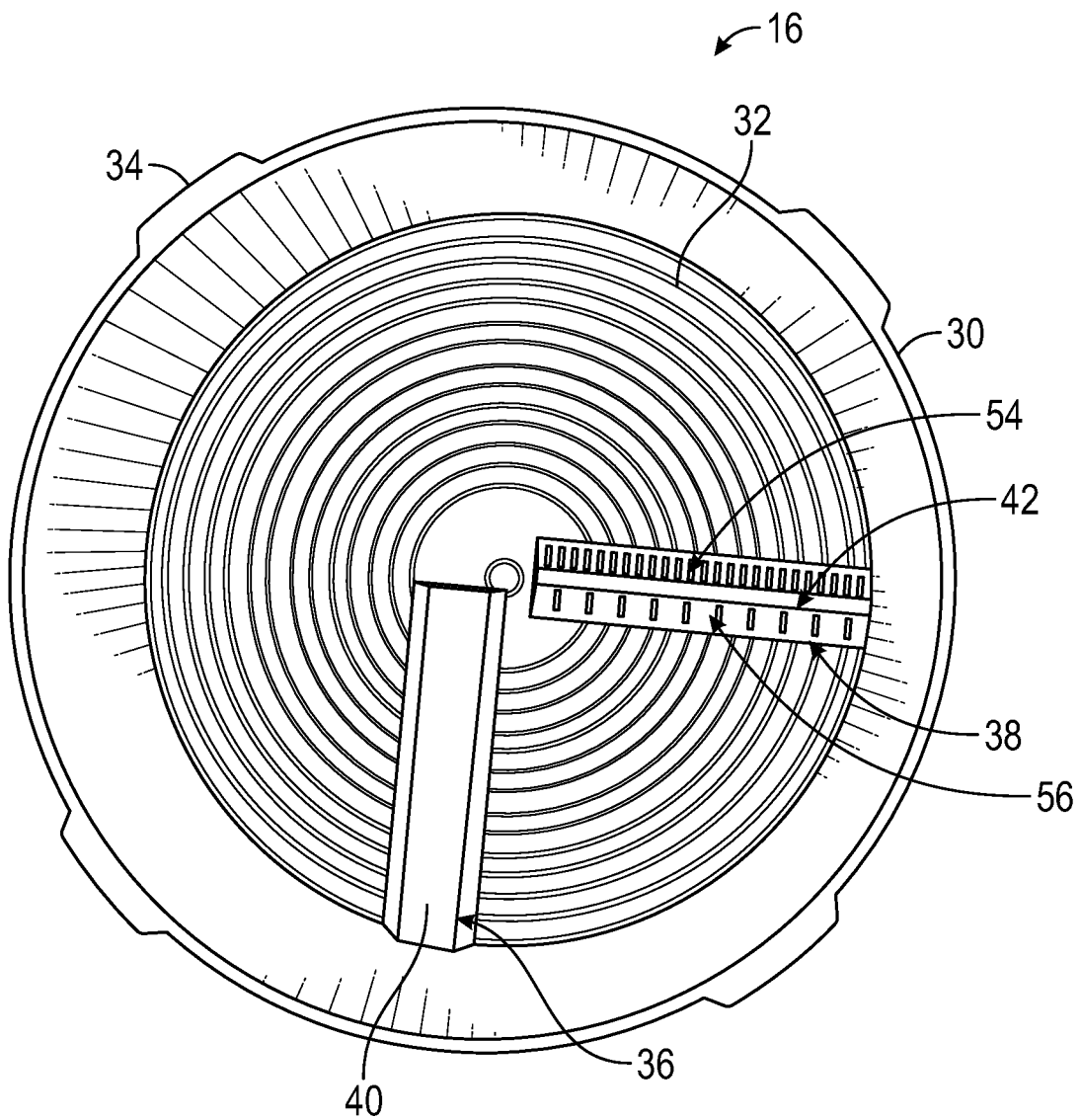
FIG. 7 is a top plan view of the processing plate, showing the julienne blade in a position intermediate a processing orientation and a stowed orientation, and the slicing blade in the stowed, safety orientation.
Figure 8:
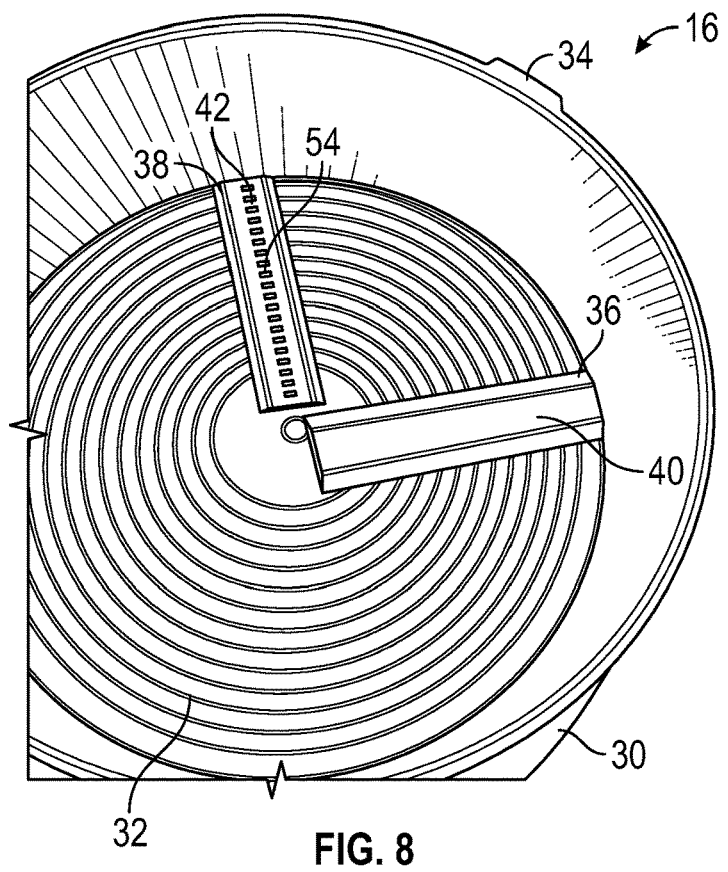
FIG. 8 is a detail, perspective view of the processing plate, showing a narrow strip side of the julienne blade in a processing orientation.
Figure 9:
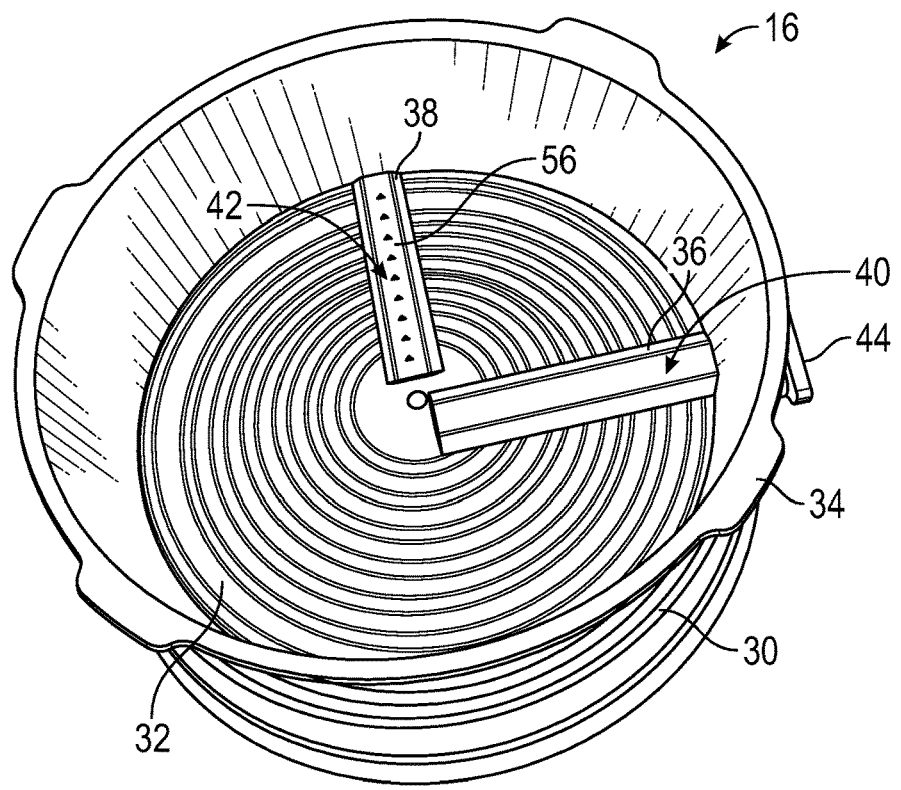
FIG. 9 is a detail, perspective view of the processing plate, showing a wide strip side of the julienne blade in a processing orientation.
Figure 10:
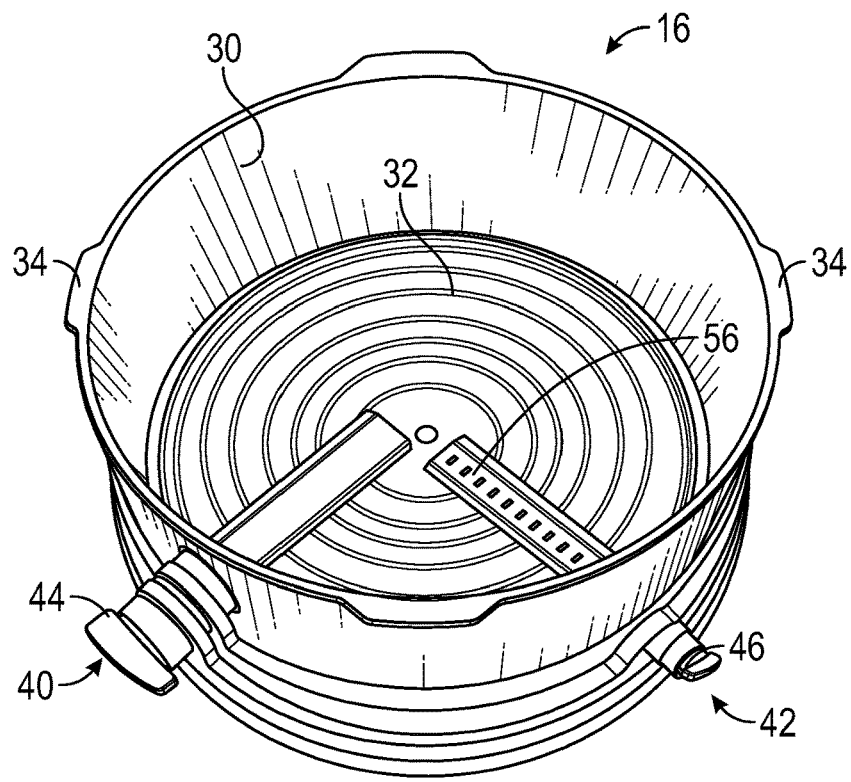
FIG. 10 is another perspective view of the processing plate, showing the wide strip side of the julienne blade in a processing orientation.

Referring now to FIGS. 7-10, the cutting member 42 may include one or more faces having blades extending outwardly therefrom. For example, as best shown in FIG. 7, a second face 54 of the cutting member 42 may be configured with a plurality of narrowly-spaced julienne blades extending outwardly therefrom, while a third face 57 of the cutting member 42 may be configured with a plurality of wider-spaced julienne blades extending outwardly therefrom. The cutting member 42 is rotatable, via rotation of knob 46, to selectively expose the flat face 50, second face 54 having narrowly-spaced julienne blades, or second face 56 having wide-spaced julienne blades within the aperture 38. For example, FIG. 8 shows the second face 54 with narrowly-spaced julienne blades positioned within the aperture 38, while FIGS. 9 and 10 show the third face with wide-spaced julienne blades positioned within the aperture 38 (and cutting member 40 in its safety position within aperture 36). While the cutting member 42 is illustrated as having three faces (including two faces having upstanding blades), the cutting member 42 may have more or fewer than three faces without departing from the broader aspects of the invention. For example, the cutting member 42 may be formed with additional faces having varied cutting blade orientations and configurations for processing food items in a variety of specific manners.

Figure 11:
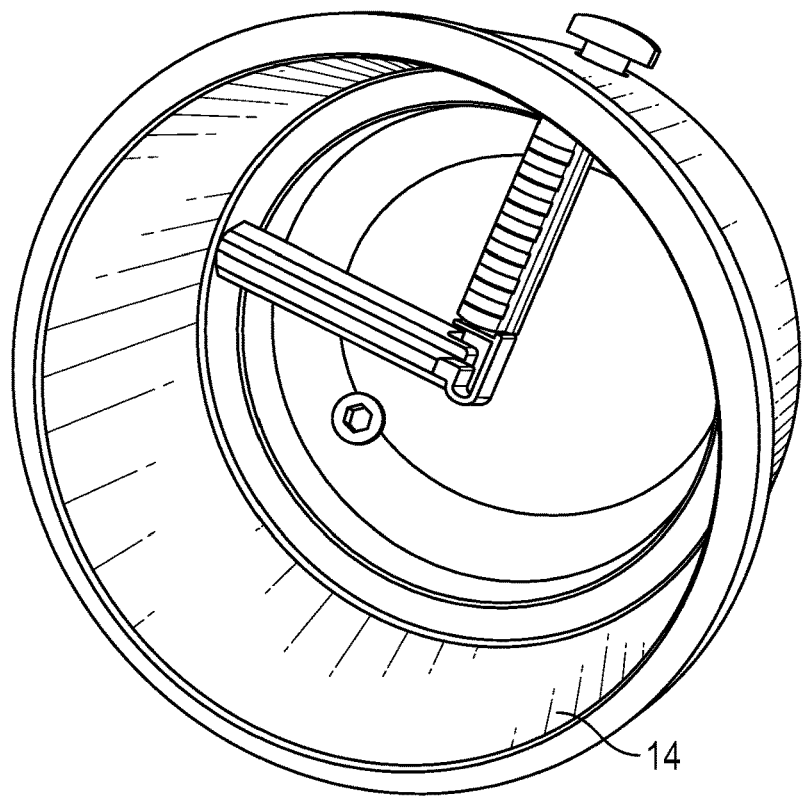
FIG. 11 is a bottom, perspective view of a collection container and processing plate of the processing device of FIG. 1.
Figure 12:
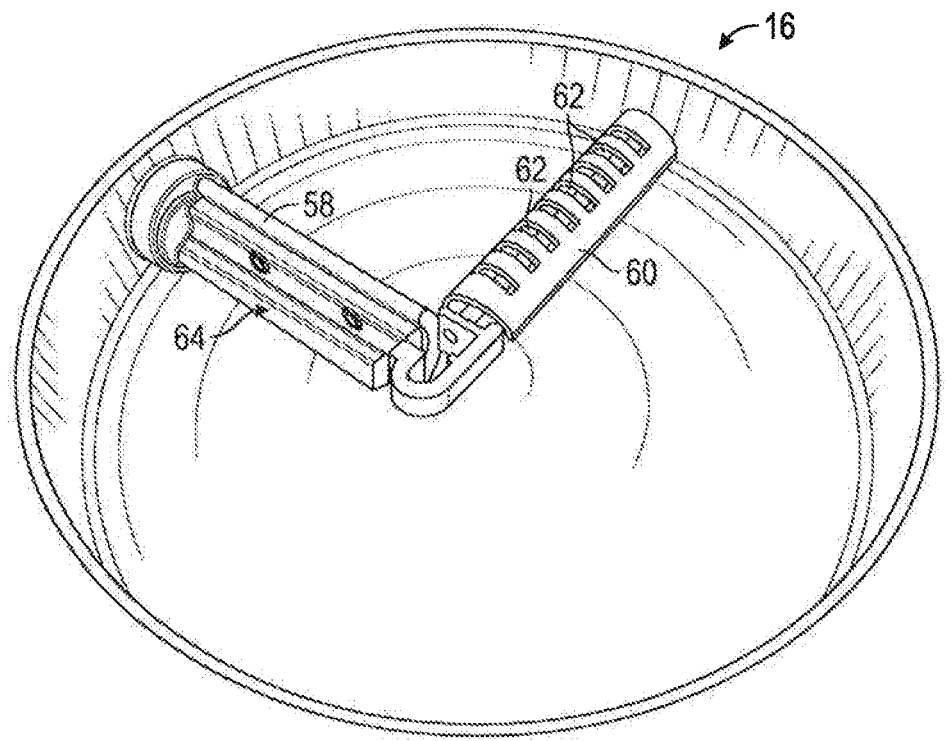
FIG. 12 is an enlarged, perspective view of the bottom of the processing plate.
Figure 13:
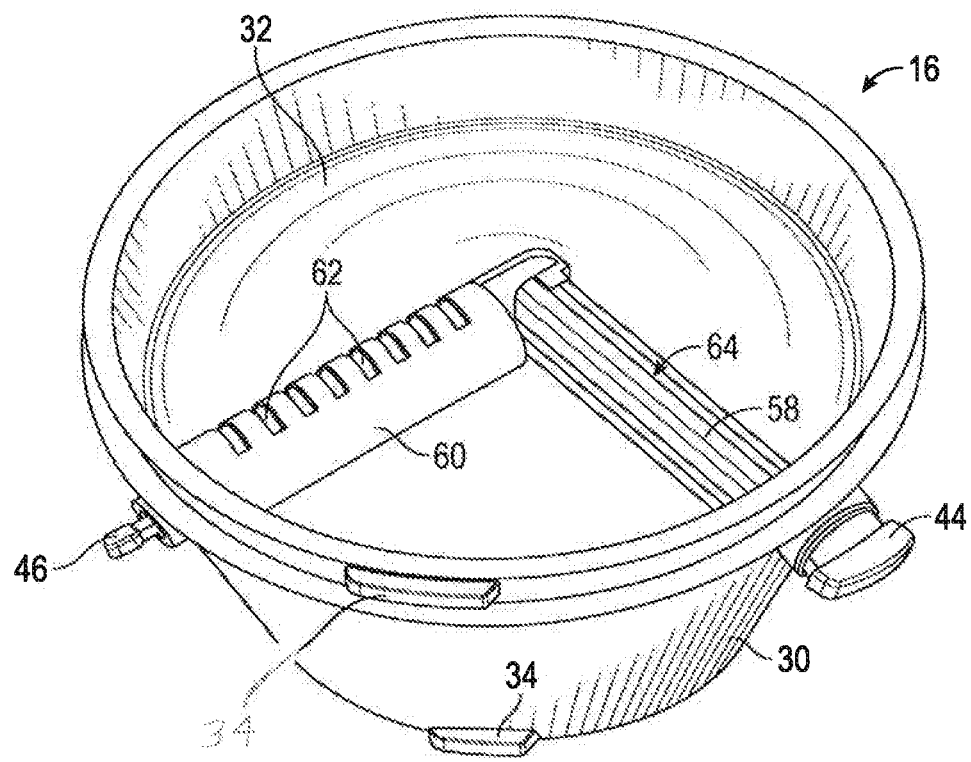
FIG. 13 is another enlarged, perspective view of the bottom of the processing plate.

FIGS. 11-13 illustrate the underside of the processing plate 16 (as seen through the collection container 14 in FIG. 11). The openings in the sidewall 30 of the processing plate 16 for receiving the cutting member 40, 42 are shown therein. As shown in FIGS. 11-13 an underside of the plate 16 adjacent to aperture 36 may be configured with an arcuate, solid guard 58, while an underside of the plate 16 adjacent to aperture 38 may be configured with an arcuate, slotted guard 60. The guards define channels for receiving the respective cutting members 40, 42. In an embodiment, at least one of the plate 16 and cutting members 40, 42 may include a retaining mechanism for retaining the respective cutting members 40, 42 in a safety or processing position.

As best shown in FIGS. 12 and 13, guard 60 includes a plurality of slotted opening 62 which allow food to exit into the collection container 14 after slicing. In an embodiment, the slots 62 are generally aligned with the spaces between the julienne blades of the cutting member 42. Similarly, guard 58 includes a single slot 64 that likewise allows food to fall through the floor 32 of the plate 16 and enter the collection container 14.

As best shown in FIG. 13, the bottom rim of the processing plate 16 may likewise include a plurality of radial lugs 62. The radial lugs 62 are configured to be received in corresponding slots (not shown) in the upper portion of the collection container 14, enabling the container 14 and the processing plate 16 to be selectively locked together in a bayonet-like manner.

In operation, with the collection container 14 secured to the underside of the processing plate 16 a user may removed the lid 12 and then insert a food item (e.g., a potato, carrot or the like) to be processed into the container defined by the processing plate 16. A user may then replace the lid 12 onto the processing plate 16. After securing the lid 12, a user may manipulate the knobs 44, 46 of the cutting members 40, 42 to achieve a desired slicing operation. Alternatively, the cutting members may be arranged in their desired positions prior to inserting a food item). For example, where spiral strings are desired, a user may rotate the knob 46 until the narrow-spaced julienne blades of face 54 or wide-spaced julienne blades of face 56 are positioned within the opening 38, and then rotate knob 44 so that the slicing blade 52 is positioned in opening 36.

The device 10 may then be placed on a surface such as a countertop and the knob 28 of driving member 22 rotated. Rotation of the knob 28 causes the shaft 20 to rotate about its axis. By applying downward hand pressure, the pusher plate 26 on the distal end of the shaft 20 advances towards the processing plate 16 until the plate 26 contacts the food item. The protrusions of the pusher plate 26 puncture the food item, and as the driving member 22 is continually rotated, the food item rotates therewith (while downward pressure is exerted by the pusher plate 26 during such rotation). The food item passes through the julienne blades of the cutting member 42 and is cut into strips before it is sliced horizontally by the slicing blade 52 of cutting member 40. The spiral strips pass through the floor 32 through the opening 36 and collect in the collection container 14. After the food item has been fully processed, a user may decouple the container 14 from the underside of the processing plate 16 for emptying of the contents of the container.

Alternatively, when julienne slicing is not desired, the cutting member 42 may be rotated so that the julienne blades are retracted below the level of the floor 32 of the plate 16. After processing, the cutting members 40, 42 may be rotated to their safety positions (where flat sides 48, 50 face upward). The lid 12 may then be removed for cleaning of the device 10 or so that another food item may be inserted.

In an embodiment, the cutting members 40, 42 are removable from the processing plate 16 for cleaning, or so that other cutting members having different cutting arrangements for different processing functions may be utilized. These functions may include grating, juicing and the like. In an embodiment, the device 10 may include a small electric motor attached to the shaft 20 so that automatic processing can be carried out.

Importantly, both the first and second cutting members 40, 42 are both removable for cleaning and interchangeability. In addition, both cutting members 40, 42 are rotatable so that the safety side of the respective cutting members may be exposed to the opening in the processing plate 16 when the device 10 is not in use, adding a level of safety heretofore not seen in the art.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A method of operating a food processing device having a collection container, a processing plate releasably received atop the collection container, and a lid releasably received atop the processing plate, said processing plate having a plurality of radial openings, said method comprising the steps of:
   rotatably positioning a first operation arm having a plurality of parallel cutting protuberances extending perpendicularly from a shaft of said first operation arm in a first radial opening of said plurality of radial openings, said first operation arm having a first position in which said cutting protuberances extend above a floor of said processing plate, and a second position in which said cutting protuberances do not extend above said floor of said processing plate;
   rotatably positioning a second operation arm having a slicing blade that extends generally parallel to said floor of said processing plate in a second radial opening of said plurality of radial openings, said slicing blade having a leading edge that extends in a radial direction within said second radial opening, said leading edge having an extent that generally corresponds to a radial extent of the second radial opening, said second operation arm having a first position in which said leading edge of said slicing blade extends above said floor of said processing plate and said slicing blade extends parallel to said processing plate, and a second position in which said leading edge does not extend above said floor of said processing plate, said processing plate having no cutting or slicing elements that extend above said floor of said processing plate when said first operation arm and said second operation arm are rotated to said second positions and when said operation arms are maintained in said radial openings; and
   selectively rotating said operation arms to move to said second positions to ensure none of said cutting protuberances nor said slicing blade extend above said floor of said processing plate.

2. The method of operating a food processing device having a collection container according to claim 1, further comprising the steps of:
   selectively rotating said operation arms to move to said second position without disengaging said processing plate from said lid.

3. The method according to claim 1, further comprising the step of:
   engaging a first plurality of radial lugs of the processing plate with the lid to inhibit rotation of the processing plate with respect to said lid.

4. The method according to claim 3, further comprising the step of:
   engaging a second plurality of radial lugs of the processing plate with said collection container to inhibit rotation of the processing plate with respect to said collection container.

5. A method of operating a food processing device having a collection container, a processing plate releasably received atop the collection container, and a lid releasably received atop the processing plate, said processing plate having a plurality of radial openings, said method comprising the steps of:
   rotatably positioning a first operation arm having a plurality of parallel cutting blades extending perpendicularly from a shaft of said first operation arm in a first radial opening of said plurality of radial openings, said first operation arm having a first position in which said cutting blades extend above a floor of said processing plate, and a second position in which said cutting blades do not extend above said floor of said processing plate;

rotatably positioning a second operation arm having a slicing blade in a second radial opening of said plurality of radial openings and extending generally parallel to said floor of said processing plate, said slicing blade having a flat surface that extends parallel to said processing plate, said second operation arm having a first position in which a leading edge of said slicing blade extends above said floor of said processing plate, and a second position in which said leading edge does not extend above said floor of said processing plate;

selectively rotating said operation arms to move to said second positions while said operation arms are maintained within said radial openings, so that neither said cutting blades nor said leading edge of said slicing blade extend above said floor of said processing plate.

6. The method according to claim 5, wherein:
said leading edge of said slicing blade extends in a radial direction within said second radial opening.

7. A method of operating a food processing device having a collection container, a processing plate releasably received atop the collection container, and a lid releasably received atop the processing plate and defining a food processing cavity therebetween, said processing plate having a plurality of radial openings, said method comprising the steps of:

rotatably positioning a first operation arm having a plurality of parallel cutting blades extending perpendicularly from a shaft of said first operation arm in a first radial opening of said plurality of radial openings, said first operation arm having a first position in which said cutting blades extend above a floor of said processing plate, and a second position in which said cutting blades do not extend above said floor of said processing plate;

rotatably positioning a second operation arm having a slicing blade in a second radial opening of said plurality of radial openings such that said slicing blade extends generally parallel to said floor of said processing plate, said second operation arm having a first position in which a leading edge of said slicing blade extends above said floor of said processing plate and said slicing blade extends parallel to said processing plate, and a second position in which said leading edge does not extend above said floor of said processing plate;

selectively rotating said operation arms to move to said second positions so that neither said cutting blades nor said leading edge of said slicing blade extend above said floor of said processing plate while said operation arms are maintained within said radial openings;

wherein said leading edge of said slicing blade extends in a radial direction within said second radial opening so as to occupy substantially an entire radial extent of the second radial opening.

8. The method according to claim 7, wherein:
said parallel cutting blades of said first operation arm include a first subset of parallel cutting blades spaced a first distance from one another, and a second subset of parallel cutting blades spaced a second distance from one another, said first distance being less than said second distance;

wherein in said first position said first subset of parallel cutting blades extend above said floor of said processing plate; and wherein said first operation arm is rotatable to a third position where said second subset of parallel cutting blades extend above said floor of said processing plate.

* * * * *